US006185700B1

(12) United States Patent
Niwa et al.

(10) Patent No.: US 6,185,700 B1
(45) Date of Patent: *Feb. 6, 2001

(54) METHOD AND DEVICE FOR EVALUATING A PROGRAM

(75) Inventors: Kunio Niwa, Tokyo; Kouichi Takahashi, Kanagawa, both of (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/751,619

(22) Filed: Nov. 18, 1996

(30) Foreign Application Priority Data

Nov. 17, 1995 (JP) ................................... 7-299880
Nov. 29, 1995 (JP) ................................... 7-311242

(51) Int. Cl.[7] ........................... H02H 3/05; H03K 19/003
(52) U.S. Cl. ................. 714/37; 714/38; 714/25
(58) Field of Search .................. 335/183.01, 183.11, 335/183.14, 183.13; 714/37, 38, 35, 25; 395/701, 704; 364/267.91, 275.5

(56) References Cited

U.S. PATENT DOCUMENTS

| 4,063,081 | | 12/1977 | Handly et al. . |
| 4,268,903 | * | 5/1981 | Miki et al. ............................. 364/200 |
| 4,868,735 | * | 9/1989 | Moller et al. ......................... 364/200 |
| 5,222,220 | * | 6/1993 | Mehta .............................. 395/183.11 |
| 5,313,616 | * | 5/1994 | Cline et al. ...................... 395/183.11 |
| 5,333,304 | * | 7/1994 | Christensen et al. .................. 714/38 |
| 5,335,344 | * | 8/1994 | Hastings .......................... 395/183.11 |
| 5,359,608 | | 10/1994 | Belz et al. . |
| 5,535,329 | * | 7/1996 | Hastings .......................... 395/183.11 |
| 5,732,272 | * | 3/1998 | Gochee ........................... 395/183.14 |
| 5,784,552 | * | 7/1998 | Bishop et al. .................... 395/183.14 |

OTHER PUBLICATIONS

"Address flow change tracing mechanism", IBM Technical Disclosure Bulletin, vol. 29, No. 8, Jan. 1987, pp. 3438–3439, XP002028348.

"Test hardware helps pinpoint software bugs", EDN Electrical Design News, vol. 31, No. 18, Sep. 1986, pp. 169–176, XP002028349.

* cited by examiner

*Primary Examiner*—Dieu-Minh T. Le
(74) *Attorney, Agent, or Firm*—Young & Thompson

(57) ABSTRACT

A method of evaluating a program in which a second program is inserted into an instruction processing of a first program, includes the steps of: latching an address value of a stack pointer when executing an instruction for calling the second program; comparing the address value of the stack pointer held with an address value of a stack pointer during a subsequent instruction execution; and when they are coincident with each other, judging the termination of execution of the second program.

5 Claims, 16 Drawing Sheets

```
MAIN:
    ...
    CALL    SUB1                (1)
    ...
    ...

SUB1:
    ...
    CALL    SUB2                (2)
    ...
    CALL    SUB2                (3)
    ...
    RET                         (4)

SUB2:
    ...
    RET                         (5)
```

```
[TASK_A]
MAIN_A:
        ...
        CALL    SYS_CALL            (1)
        ...
        CALL    SUB1_A              (2)
        ...
        CALL    SYS_CALL            (3)
        ...
        ...

SUB1_A:
        ...
        CALL    SUB2_A              (4)
        ...
        CALL    SYS_CALL            (5)
        ...
        RET                         (6)

SUB2_A:
        ...
        CALL    SYS_CALL            (7)
        ...
        RET                         (8)

[TASK_B]
MAIN_B:
        ...
        CALL    SYS_CALL            (9)
        ...
        CALL    SUB1_B              (10)
        ...
        ...

SUB1_B:
        ...
        CALL    SYS_CALL            (11)
        ...
        RET                         (12)
```

FIG. 14
PRIOR ART ly to a procedure step execution
METHOD AND DEVICE FOR EVALUATING A PROGRAM

BACKGROUND OF THE INVENTION

1. Field of the Invention

The present invention relates to a function of executing only one machine instruction for a program evaluation device, and more particular for executing a called sub-program together.

In the case of executing program development, one program is made up of a large number of sub-programs (sub-routines). There are many cases in which each sub-program is processed by calling further another sub-program therefrom, thus providing nestings several times over. The procedure for debugging of the program thus structured is not to debug the entire large program from the beginning, but to debug a sub-program from a lower stack of the nesting toward higher stacks sequentially. In this case, because the sub-programs in the lower stacks have been debugged, they need not be called when the higher sub-program is debugged.

For debugging a program, a method of executing steps for each instruction is frequently used, however, it is unnecessary to execute the steps for the sub-program which has been debugged. For that reason, the program evaluation device for debugging the program has a function called "procedure step execution" for executing steps within the sub-program together.

2. Description of the Related Art

A conventional procedure step execution function is to count the number of executions of sub-program call instructions (hereinafter referred to as "CALL") and the number of executions of reset instructions (hereinafter referred to as "RET") from the sub-program, respectively, and to judge that the execution of the sub-program has been terminated when the former is coincident with the latter. Hereinafter, a description will be given of the flow of the respective steps (1) to (7) illustrated in FIG. 9.

In step (1), it is judged whether an instruction to be executed is CALL, RET or another instruction, and in case of CALL, CALL is executed and its occurrence is counted in steps (2) and (3). If it is judged that the instruction is RET, RET is executed and its occurrences is counted in steps (5) and (6). If it is judged that the instruction is neither CALL nor RET, the instruction is executed in step (4), and control returns to step (1) for the execution of the succeeding instruction.

If the executed instruction is CALL or RET, in step (7), the number of occurrences of CALL is compared with that of RET, and if the former is coincident with the latter, it is judged that the execution of the sub-program which has been called initially has been terminated. In this situation, if the former is inconsistent with the latter, it is judged that the execution of the sub-program which has been called initially has not yet been terminated, and control returns to step (1) for the execution of the succeeding instruction.

Subsequently, the conventional procedure step execution will be described in detail with an example of the program shown in FIG. 10. A method of judging the termination of a sub-program which will be described below is slightly different from the method of judging the completion shown in FIG. 9. The method of FIG. 10 substitutes the number of CALL executions for a variable which is COUNT, and COUNT is increased by the execution of CALL but decreased by the execution of RET so that when COUNT is 0, it is judged that the sub-program is terminated. FIG. 10 shows a program for calling and processing sub-programs SUB1 and SUB2 in a program of MAIN, and FIG. 11 shows a schematic diagram of the processing, and a change in COUNT. In FIG. 11, CALL and RET in steps (1) to (5) correspond to steps (1) to (5) in FIG. 10.

First of all, in the case where CALL of (A) is executed, COUNT is increased with the result of COUNT=1; in the case of CALL of (B), COUNT=2; in the case of RET of (C), COUNT=1; in the case of CALL of (D), COUNT=2; in the case of RET of (E), COUNT=1; and in the case of RET of (F), COUNT=0. Thus, the termination of the sub-program is determined.

A circuit for executing the above-mentioned method of judging the sub-program termination will be described with reference to FIGS. 2 and 12.

FIG. 2 is a diagram showing the entire system for conducting program evaluation. Reference numeral 200 denotes a program evaluation device; 218, a host computer for controlling the program evaluation device 200; and 216, a target system controlled by a debugged program. Hereinafter, the respective components of the program evaluation device 200 will be described.

A CPU 202 controls the respective components of the program evaluation device using a ROM 204 and a RAM 203 in which a control program is stored. An evaluation processor 205 has two operation modes consisting of a user mode that executes a program to be debugged and a supervisor mode that conducts debugging. The evaluation processor 205 uses a ROM 207 and a RAM 206 in which the supervisor program is stored at the time of the supervisor mode, and a ROM 209 and a RAM 208 in which a program to be debugged is stored at the time of the user mode. Those ROMs 204, 207, 209 and RAMs 203, 206, 208 are connected to each other through a variety of buses such as an address bus 210, a data bus 211 or a control bus 212. The evaluation bus 205 and a target system 216 are connected through a bus 217. A termination judging circuit 201 determines whether the sub-program has terminated.

For the evaluation of a program, the host computer 218 stores the control program in the ROM 204, the supervisor program in the ROM 207 and the program to be debugged in the ROM 209, respectively, in advance. Needless to say the ROMS may be EPROMs or RAMs. Then, the evaluation processor 205 starts the supervisor program according to the control program to prepare program evaluation. When the evaluation processor 205 is in the supervisor mode, the ROM 209 and the RAM 208 in which the program to be debugged is programmed, a value of an inner register in the evaluation processor 205 according to the execution result of the program to be debugged, and a state within the target system 216 as occasion demands are monitored so that they can be confirmed by the host computer 218.

Upon starting the evaluation of program, the evaluation processor 205 allows a reset signal 213 to be generated from the CPU 202 in the supervisor mode, to initiate a flip flop circuit 1 and an up/down counter 16 (shown in FIG. 12). Then, referring to the ROM 209, it is judged whether an instruction to be executed by the program to be debugged is CALL or other instructions. In the case of an instruction other than CALL, the CPU 202 makes a step execution control terminal 214 active. When a step execution control terminal 10 becomes active, the evaluation processor 205 executes one instruction of the program to be debugged in the user mode, and returns to be in the supervisor mode again. It should be noted that since the step execution control signal 214 is latched by an I/O port 222, the CPU 202 makes the step execution control signal 214 inactive when the evaluation processor 205 returns to be in the supervisor mode.

In the case where the program to be debugged is CALL, the step execution control signal 214 is not made active and executes CALL in the user mode. In this case, the program to be debugged is executed continuously even after CALL is executed. The CALL strobe terminal 11 and the RET strobe terminal 12 of the evaluation processor 205 output 1 level when executing a normal instruction, but when executing CALL or RET, outputs 0 level from corresponding strobe terminals, respectively. This is conducted by microprograms of CALL and RET of the evaluation processor 205.

The flip flop circuit 1 outputs 1 level to a supervisor interrupt request (SVIRQ) terminal 9 since it is reset in advance as described above. An up/down counter 16 up-counts at the rising of a CALL strobe and down-counts at the rising of RET strobe. In other words, the count operation is conducted when the execution of CALL and RET is terminated.

An invertor circuit 15 inverts the output of D0 bit of the up/down counter 16. An 8-input OR circuit 14 outputs 0 level to a line S1 when all of the output of the invertor circuit 15 and the outputs of D1 to D7 bits of the up/down counter 16 are 0, that is, when a value of the up/down counter 16 is 1. An OR circuit 2 outputs 0 level to a line S2 if the RET strobe becomes 0 level when the line S1 is 0 level. The flip flop circuit 1 is set when the line S2 becomes 0 level, and thereafter outputs 0 level to an SVIRQ terminal 9. The evaluation processor 205 stops the execution of a program to be debugged when an SVIRQ terminal 9 becomes 0 level, and returns to be in the supervisor mode.

In conclusion, when RET is executed in a state where the count value of the up/down counter 16 is 1, it is judged that the execution of the sub-program is terminated.

FIG. 13 is a timing chart showing the operation of a sub-program termination judging circuit when the program shown in FIG. 10 is operated. In the figure, the respective symbols are common to those in FIG. 12. CALL strobes at times t1, t5 and t13 and RET strobes at times t9, t17 and t21 correspond to CALLs of (A), (B) and (D) and RETs of (C), (E) and (F) in FIG. 11, respectively. Count values (D0, D1, D2 to D7) of the up/down counter 16 become 1 at times t2 to t5, t10 to t13, t18 to t21, and the line S1 becomes 1 correspondingly. Further, since the RET strobe is generated at time t21, the line S1 and the line S2 become 0 level at the same time, and the subsequent SVIRQs become 0 level.

There is a case in which the program evaluation device using the above sub-program termination judging method is not normally operated in the case of using a real time OS as an OS or in the case of conducting a branching process of the sub-program (restart call) such that a certain program calls itself.

Hereinafter, a description will be given of problems caused when conducting the conventional sub-program termination judging method with a real time OS. The real time OS is an OS that operates while switching a plurality of programs that are divided into units which are called "task" according to the situation, and a task under execution is switched by issuance of a system call to OS or occurrence of an event due to interrupt. Also, the task is divided into several sub-programs as in the normal program and developed.

There is a case in which CALL is not coincident with RET in the number of times of execution due to switching of the tasks. Hereinafter, the number of times of execution of CALL and RET in the case of using the real time OS will be described with an example of program shown in FIG. 14. This program is that MAIN_A, SUB1_A, and SUB2_A belongs to a program group of TASK_A, and MAIN_B and SUB1_B belongs to a program group of TASK_B. The TASK_A and TASK_B are program groups independent from each other, and therefore there is no case in which TASK_A calls TASK_B. Also, "CALL SYS_CALL" issues a system call to the real time OS.

FIG. 15 is a schematic diagram showing a processing when executing the program shown in FIG. 14, and represents a state in which an executing process with a time being elapsed is switched to TASK_A, TASK_B and a real time OS. In this case, the executed task is switched to TASK_B over TIME 3 to TIME 4.

FIGS. 16 and 17 show the flows of processes of TASK_A and TASK_B in detail, respectively. CALLs and RETs of (2) to (11) in FIGS. 16 and 17 correspond to (2) to (11) in FIG. 14. Also, in FIGS. 16 and 18, symbols (A) to (M) are indicated in correspondence with the flow of processes, and (A), (E) and (H) are RET when the real time OS returns to TASK_A, and (K) is RET when the real time OS returns to TASK_B. It should be noted that the operation of returning from the real time OS to the task is conducted by managing OS by itself. FIGS. 18 and 19 show the address values and the contents of stack of a stack pointer after CALL and RET have been executed. In this example, it is assumed that the stack region of TASK_A is 0F740H to 0F77FH, and the stack region of TASK_B is 0F700H to 0F73FH. At the real time OS, individual stack regions are assigned to each task, and when the task is switched, the stack region is also switched together. In other words, the sub-program can be called individually for each task.

Hereinafter, a case of executing the procedure step of "CALL SUB1_A" of (2) in FIG. 14 will be described with reference to FIG. 16. In this case, processing flows in the order of (B), (C), (D), (K), (L), (M), (E), (F), (G), (H) and (I). In other words, six CALLs and four RETs are executed. Hence, because CALL and RET are different in the number of times of execution, a case of using the conventional sub-program termination judging method suffers from such a problem that it is judged that the sub-program SUB1_A is not terminated even after the execution of RET of (1).

There is a case in which the conventional program evaluation device incorrectly determines the termination of the sub-program which is called by the program to be debugged in the case of applying the real time OS as an OS of the program to be debugged.

Also, even in the case of using no real time OS, since the conventional program evaluation device determines the termination of sub-program by the number of times of execution of CALL and RET, the termination of the sub-program cannot be judged without using this. In other words, there is a case in which, when the processing of the program returns from a subordinate sub-program to a superordinate program, means is used which extracts an address value latched in the stack from a certain register (stack extraction instruction POP), and then branches it to the address value of that register (branch instruction BR). If such a means is applied when the processing returns from the sub-program to a main program, CALL is not coincident with RET in the number of times of execution. Hence, the termination of the sub-program cannot be correctly judged.

SUMMARY OF THE INVENTION

The present invention has been made in view of the above circumstances, and therefore an object of the present invention is to provide a program evaluation device having a procedure step execution function that copes with even the real time OS in addition to the normal OS.

Also, another object of the present invention is to provide a program evaluation device that copes with even a case of using no RET as a return instruction from the sub-program.

For the above real time OS, according to the present invention, the-termination of execution of the sub-program is judged by using the address value of a stack point that changes when the processing of a program branches from the main program to the sub-program. Specifically, in the case where an instruction for calling the sub-program exists in a program to be debugged, the address value of the stack pointer when initially executing the instruction for calling the sub-program in the program to be debugged is latched, and the latched address value of the stack pointer is compared with a current address value of the stack pointer which has changed during the execution of the sub-program. When the former is coincident with the latter, it is judged that the execution of the sub-program which has been called from the program to be debugged is terminated.

Also, the address value retreated in the stack when the processing of the program branches from the main program to the sub-program and a change in the address value of the program counter during the execution of the sub-program are monitored, and when the former is coincident with the latter, the termination of the sub-program is judged.

The above and other objects and features of the present invention will be more apparent from the following description taken in conjunction with the accompanying drawings.

BRIEF DESCRIPTION OF THE DRAWINGS

FIG. 14 is a diagram showing an example of program in the case of using a real time OS;

DETAILED DESCRIPTION OF THE PREFERRED EMBODIMENTS

Hereinafter, a description will be given in more detail of the preferred embodiments of the present invention with reference to the accompanying drawings.

Figure 1:
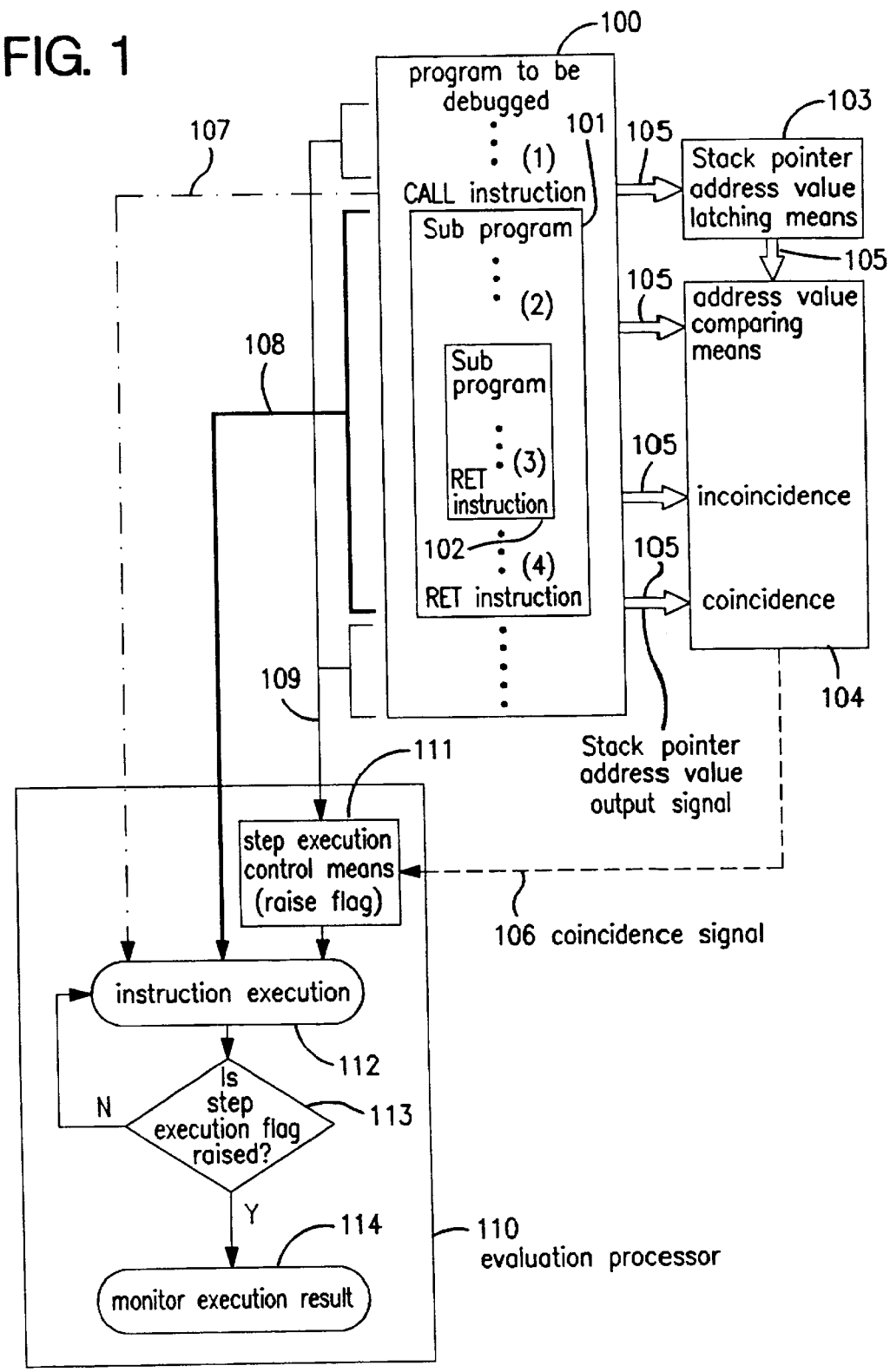
FIG. 1 is a block diagram showing a base of the present invention.

FIG. 1 is a block diagram showing a process which is a base process of the present invention in accordance with a first embodiment of the invention. In FIG. 1, reference numeral 100 denotes a program to be debugged; 101, a sub-program which is called by the program to be debugged during its processing; and 102, a sub-program which is called by the sub-program 101, assuming that debugging has already been completed. Also, reference numeral 107 denotes CALL of the program to be debugged; 108, an instruction from the sub-programs 101 and 102; and 109, an instruction from the program 100 to be debugged other than CALL and RET.

When the evaluation of the program is started and the instruction in the program 100 to be debugged other than CALL and RET is executed, a flag for conducting the step execution of the instruction arises in a step execution control means 111 within an evaluation processor 110 so that an instruction execution processing 112 is conducted. Then, since it is judged in a processing 113 for checking a flag state that the flag arises, a processing 114 for checking an instruction execution result (program evaluation) is executed. In other words, the execution result is checked for each execution of one instruction.

In a process for executing the program 100 to be debugged, when an instruction to be executed is CALL, the address value of the stack pointer is latched in an address value latching means 103 and outputted to an address value comparison means 104 as an address value output signal 105. Then, CALL is executed without the arising of the flag of the step execution control means 111, and the sub-program 101 is called. After the execution of CALL, since it is judged that no flag arises in the processing 113, the sub-program 101 is continuously executed. In the case where CALL of (2) exists in the sub-program 101, the address value of the stack pointer under the execution is outputted to the address value comparison means 104. Likewise, in execution of RET, the address value of the stack pointer is outputted to the address value comparison means 104, and then compared with the address value of the stack pointer under the execution of CALL of (1) which is outputted from the address value latching means 103, sequentially. As a result of continuing the execution of the sub-program, RET of (4) in the sub-program 101 is executed. Since the RET is an instruction for returning the sub-program 101 to the program 100 to be debugged, the address value comparison means judges that the address value of the stack pointer is coincident with the address value of the stack pointer under the execution of CALL of (1), and generates a coincidence signal to the step execution control means 111, thus allowing the flag of the step execution control to arise. Then, since it is judged in the processing 113 that the flag arises, it is judged that the execution of the sub-program is terminated, and the instruction execution result is checked in the processing 114.

In conclusion, in the execution of the program, the address value of the stack pointer under the execution of CALL to be executed initially, that is, the address value of the stack pointer where a return address of the program is latched under the execution of CALL is latched, and control is shifted to the execution of the sub-program. However, when CALL exists in the sub-program, the address value of the stack is not latched, and the address value of the stack pointer which changes with CALL and RET is compared with the address value of the stack pointer which has been initially latched, and when the former is coincident with the latter, the execution of the sub-program is regarded as being terminated.

Figure 18:
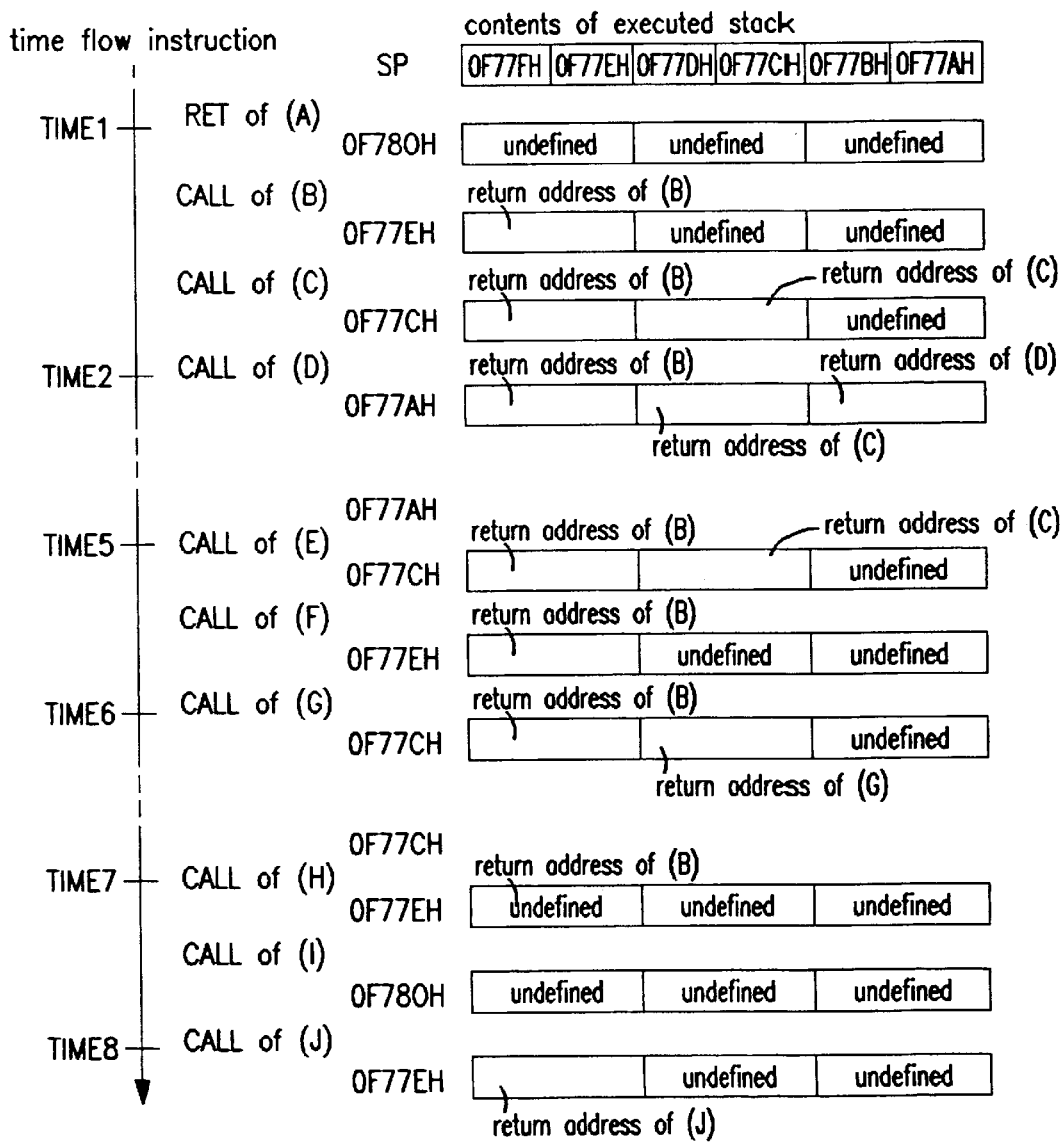
FIG. 18 is a schematic diagram showing a change in stack of TASK_A of the program in FIG. 14.
Figure 19:
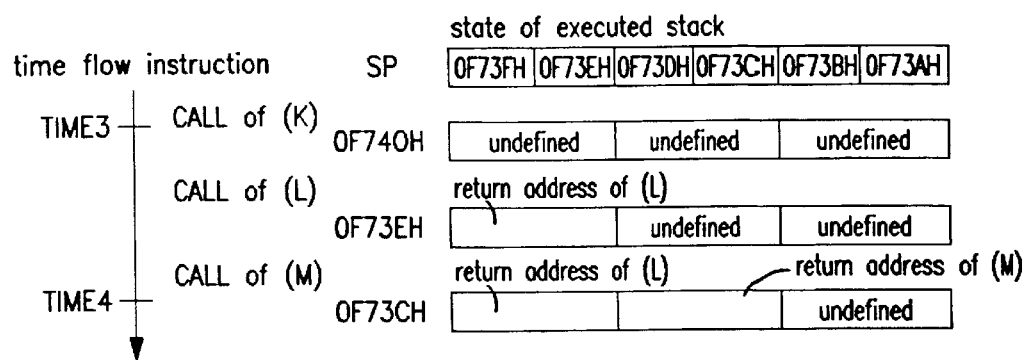
FIG. 19 is a schematic diagram showing a change in stack of TASK_B of the program in FIG. 14.

Now, the comparison of address values of the stack pointer will be described with reference to FIGS. 18 and 19 showing the stack pointer during the process of executing the program of the real time OS in FIG. 14. In MAIN_A which is a main program of TASK_A in FIG. 14, since "CALL SYS_CALL" of (1) merely branches to the real time OS and is returned, the execution of "CALL SYS_SUB1_A" of (2) will be described. In FIG. 18, (2) of FIG. 14 corresponds to (B), and "OF780H" is latched in the means for latching the address value of the stack pointer. Thereafter, CALLs of (C) and (D) are executed, and the address value of the stack pointer is changed. However, its value is not latched in a specific latching means. In TIME 3–4, the address value is shifted to TASK_B. However, when returning to TASK_A, the address value of the stack pointer becomes a value which is before shifting to TASK_B. Thereafter, processing is executed, and consequently, because upon the execution of RET of (I), the address value of the stack pointer becomes "OF780H", it becomes equal to the latched address value, and the execution of the sub-program which has been called in (2) of FIG. 14 is terminated. As a result, the termination of the sub-program is correctly judged.

Figure 2:
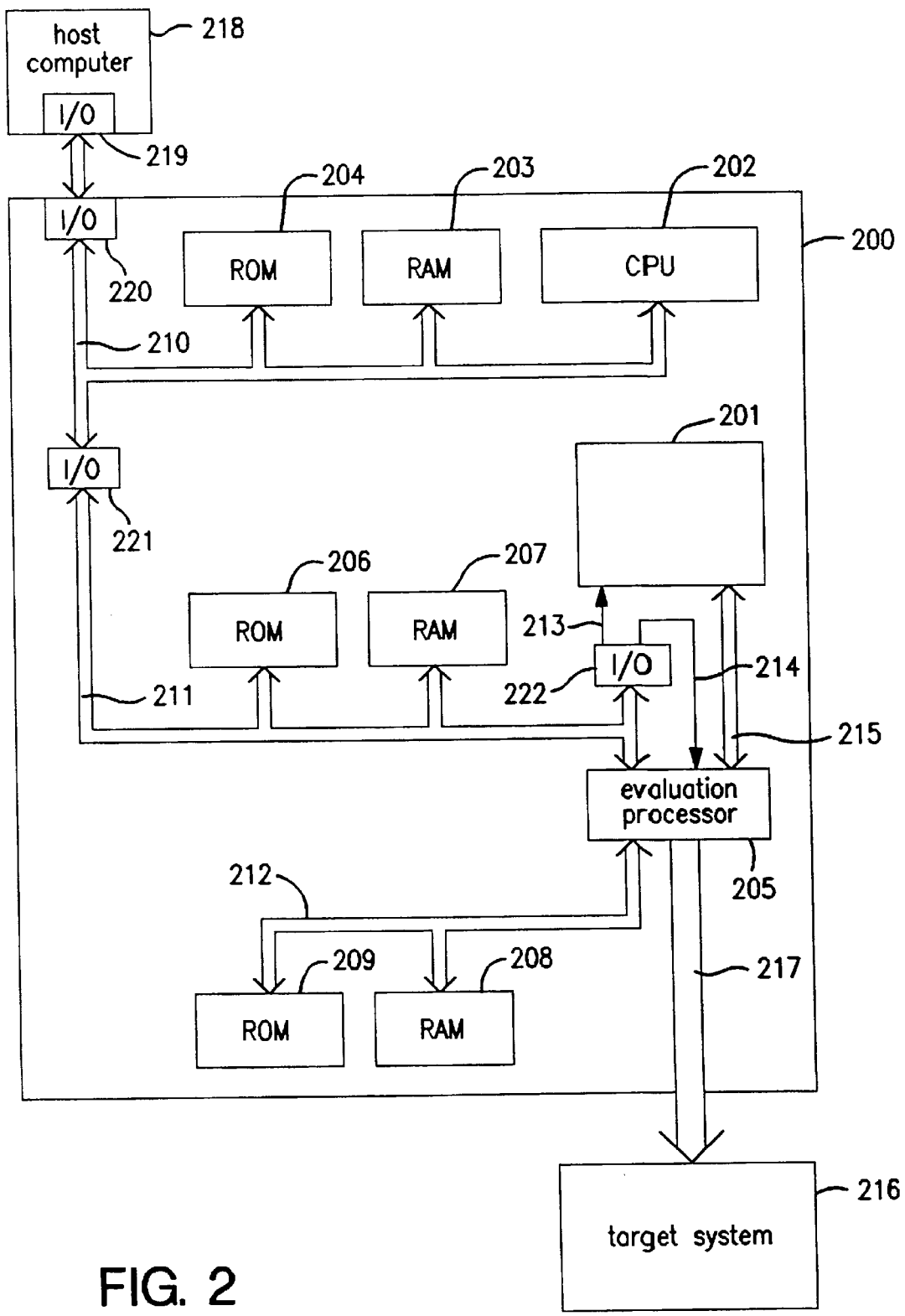
FIG. 2 is a diagram showing an entire program evaluation device.
Figure 3:
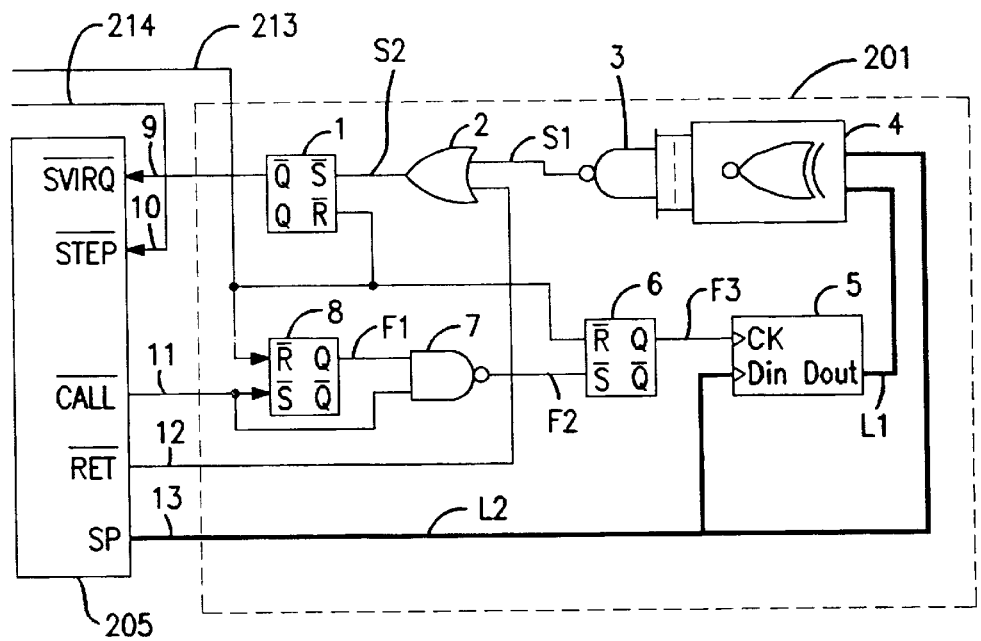
FIG. 3 is a diagram showing a sub-program termination judging circuit in accordance with a second embodiment of the present invention.
Figure 12:
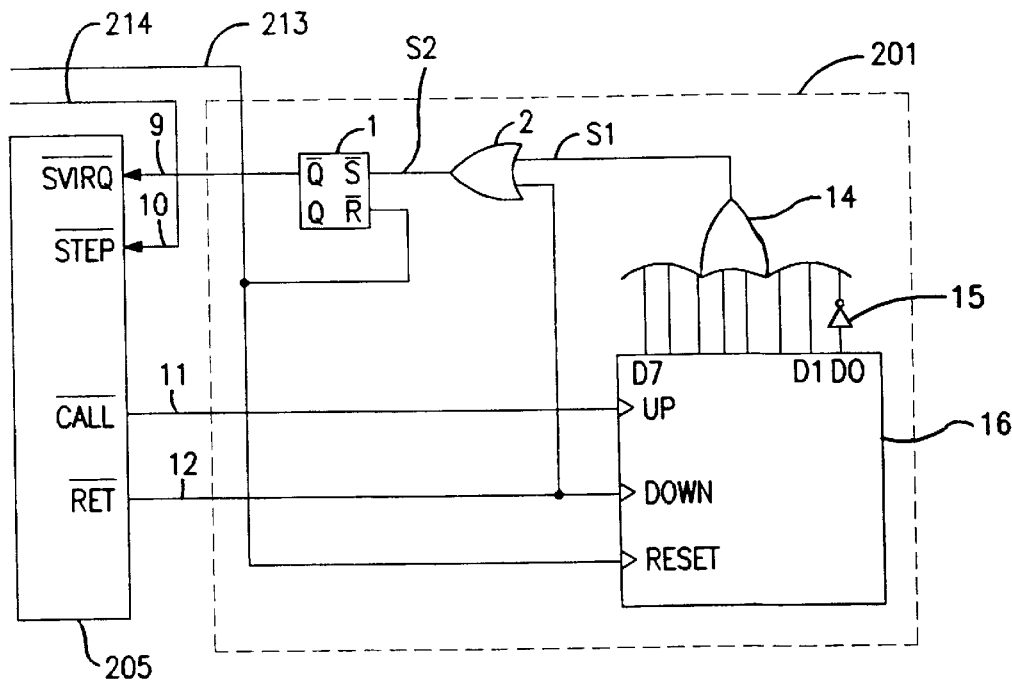
FIG. 12 is a diagram showing a conventional sub-program termination judging circuit.
Figure 13:
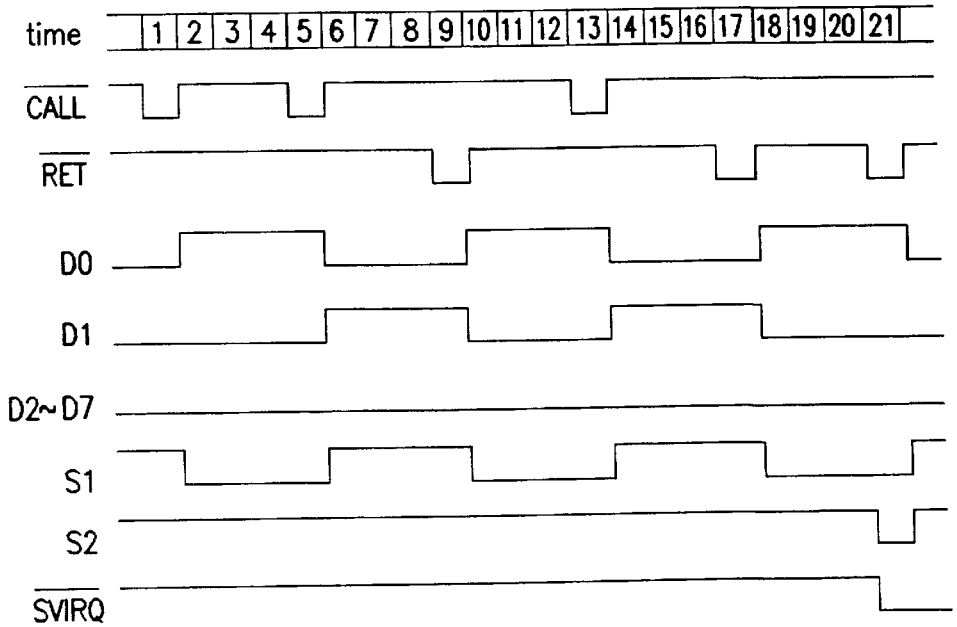
FIG. 13 is a timing chart of the circuit shown in FIG. 12.
Figure 15:
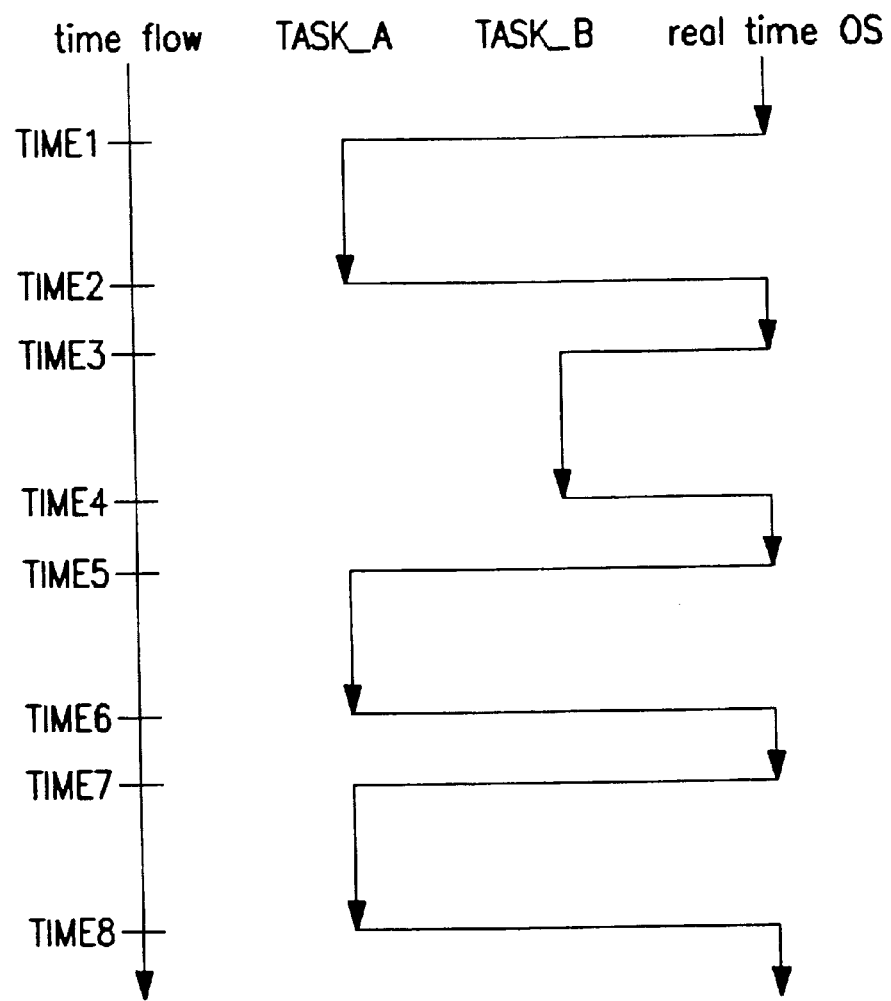
FIG. 15 is a schematic diagram showing the switching of tasks through the program shown in FIG. 14.
Figure 16:
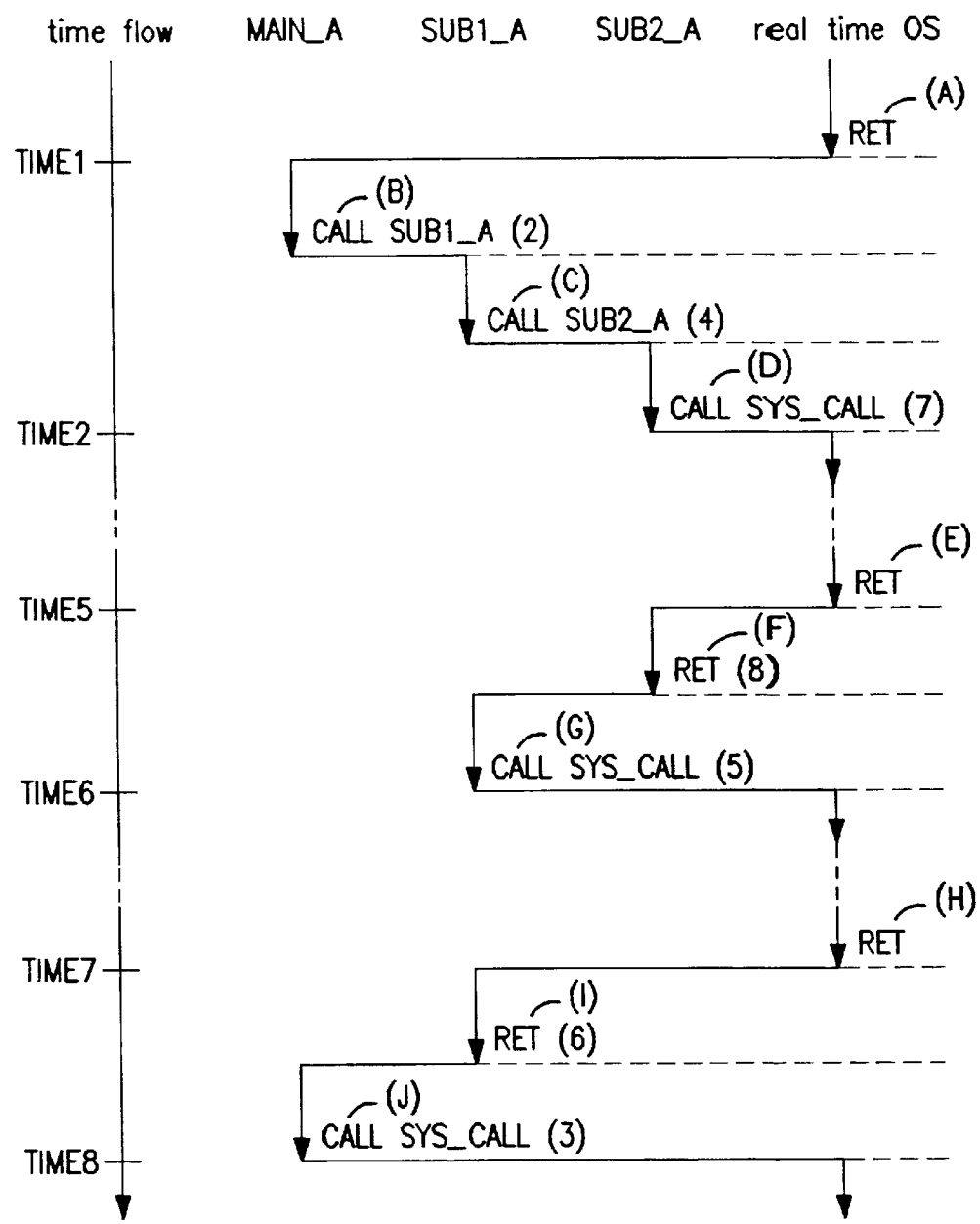
FIG. 16 is a schematic diagram showing a TASK_A processing of the program in FIG. 14.
Figure 17:
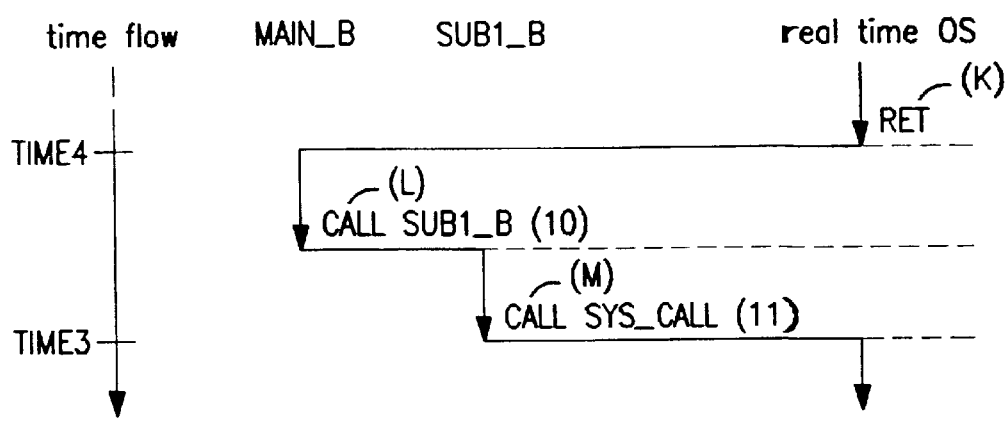
FIG. 17 is a schematic diagram showing a TASK_B processing of the program in FIG. 14.

FIG. 3 shows hardware which is realized in accordance with a second embodiment of the present invention. The parts identical with those in FIG. 12 are designated by the same symbols. The entire structure of the program evaluation device is identical with that of FIG. 2.

Hereinafter, the operation of a circuit shown in FIG. 3 will be described. An evaluation processor 205, compared with the conventional example, conducts the same operation as that of the conventional example in a supervisor mode and a user mode except that it outputs an address value of the stack pointer to a stack pointer output terminal 13, and therefore the operation except for the judgement of termination of the sub-program will be omitted. It should be noted that a variety of control signals 215 shown in FIG. 2 represent a stack pointer output signal 13 in addition to a CALL strobe, a RET strobe, and an SVIRQ as in the conventional example. Flip flop circuits 1, 6 and 8 are reset by a reset signal 213 in advance as in the conventional example. The flip flop circuit 8, an NAND circuit 7 and the flip flop circuit 6 allows a line F3 to change from level 0 to level 1 at the termination of execution of an initial CALL (an initial rise of the CALL strobe), and thereafter allows the F3 to maintain level 1 even when a CALL strobe occurs. A 16-bit latch circuit 5 latches a value of a line L2 at the rising of the line F3, and outputs it to a line L1. In other words, the 16-bit latch circuit 5 is so designed as to latch the address value of the stack pointer at the termination of execution of the initial CALL and thereafter to hold the value. An address value latching means 103 of FIG. 1 corresponds to the 16-bit latch circuit 5. 16 EXNOR circuits 4 and a 16-input NAND circuits 3 compare an output of the 16-bit latch circuit 5 with an output of a stack pointer output terminal 13, and outputs level 0 to the line S1 when they are coincident with each other. An OR circuit 2 outputs level 0 to the line S2 when the RET strobe becomes level 0 while the line S1 is level 0. The flip flop circuit 1 is reset by level 0 of the line S2, and thereafter outputs level 0 to an SVIRQ terminal 9, and the evaluation processor 205 is shifted to be in the supervisor mode.

Figure 4:
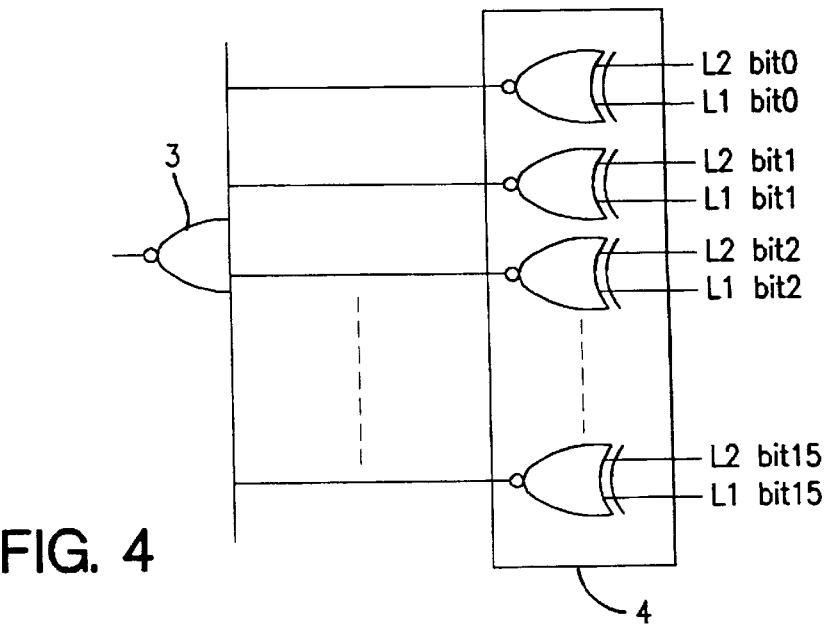
FIG. 4 is a diagram showing the connection of a NAND circuit 3 and a NOR circuit 4 of FIG. 3.

FIG. 4 is a diagram showing the connection of the 16-input NAND circuit 3 and the EXNOR circuit 4 in FIG. 3 in detail. 16 EXNOR circuits compare bit lines corresponding to lines L1 and L2 which are 16 bit lines in FIG. 3 with each other, and all the EXNOR circuits judge their coincidence to output level 1. As a result, the 16-input NAND circuit 3 outputs level 0.

Figure 5:
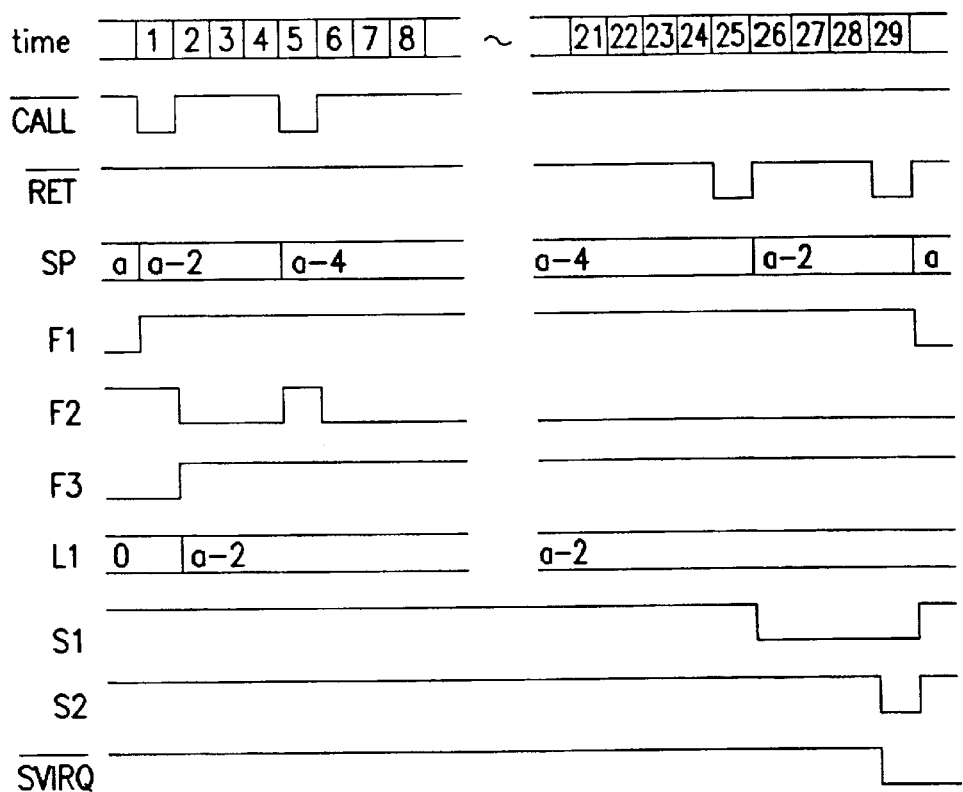
FIG. 5 is a timing chart showing the circuit of FIG. 3.

FIG. 5 is a timing chart showing the operation of the sub-program termination judging circuit of FIG. 3. In the figure, the respective symbols are identical with those in FIG. 3. It is assumed that task is switched during time t8 to t21. It should be noted that in this embodiment, the address value is added or subtracted with a unit of 2. Assuming that the address value SP at the stack pointer is a before the execution of the initial CALL, it becomes a-2 at the start of the initial CALL at time t1. Then, the line F2 becomes level 0 correspondingly at the termination of CALL at time t1, and the line F3 becomes level 1. Since the 16-bit latch circuit 5 latches a value of the address value SP at the stack pointer in correspondence with the level 1 of the line F3, the line L1 becomes a-2 at the end of time t1. Thereafter, the line F2 becomes level 1 by the CALL strobe at the start of CALL at time t5, but the line F3 is not changed, and therefore line L1 is not also changed. It should be noted that the address value SP at the stack pointer becomes a-4. At time t25, the address value SP at the stack pointer is returned to a-2 at the termination of RET. In other words, at time t26 to t29, because the value of the address value SP at the stack pointer returns to the value at the termination of execution of the initial CALL, the line S1 becomes level 0. Further, at time t29, because the line S1 and the RET strobe become level 0 at the same time, the line S2 becomes level 0, and after time t29, SVIRQ becomes 0 level. As a result, an evaluation chip 205 is shifted to be in the supervisor mode.

As described above, according to the second embodiment of the present invention, the address value after the stack pointer during the process of executing the initial CALL is changed is stored, and thereafter it is sequentially compared with the address value at the stack pointer that changes so that it is successively compared with the address value before the stack pointer changes during the process of executing RET that returns to the main program, thereby being capable of correctly determining the termination of the sub-program.

Figure 6:
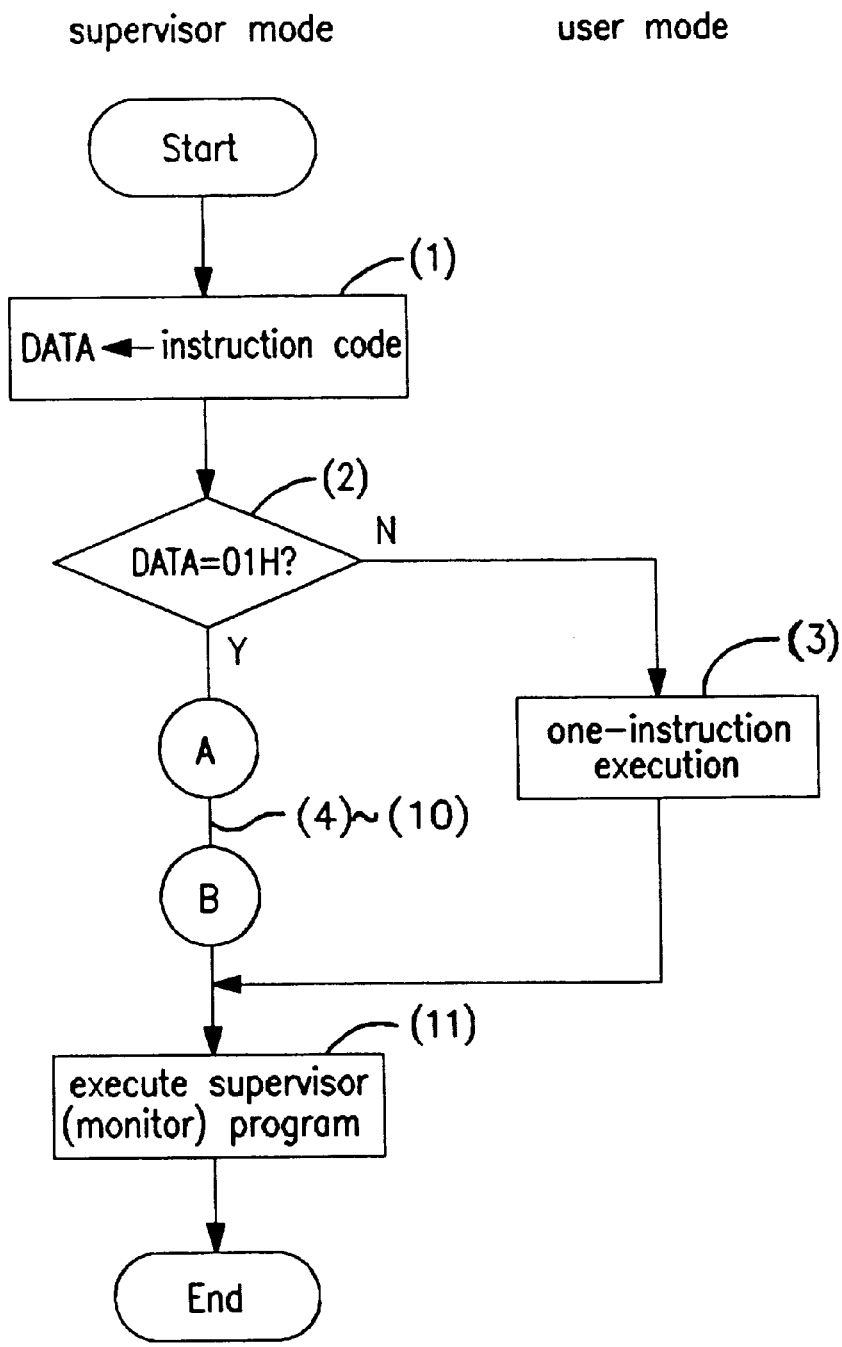
FIG. 6 is a flow chart showing the entire process of a third embodiment.
Figure 7:
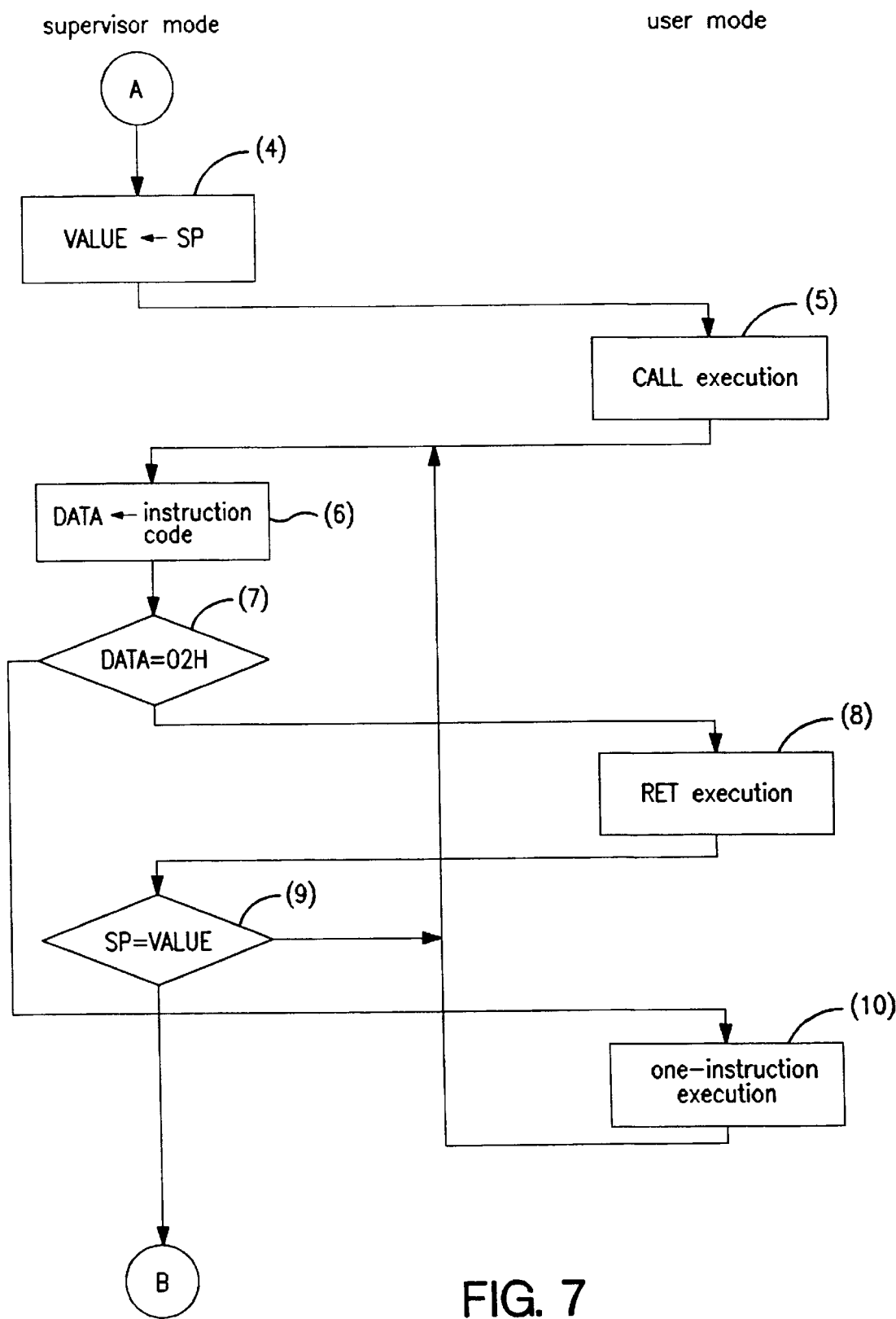
FIG. 7 is a flow chart showing a sub-program termination judgement in accordance with the third embodiment.
Figure 8:
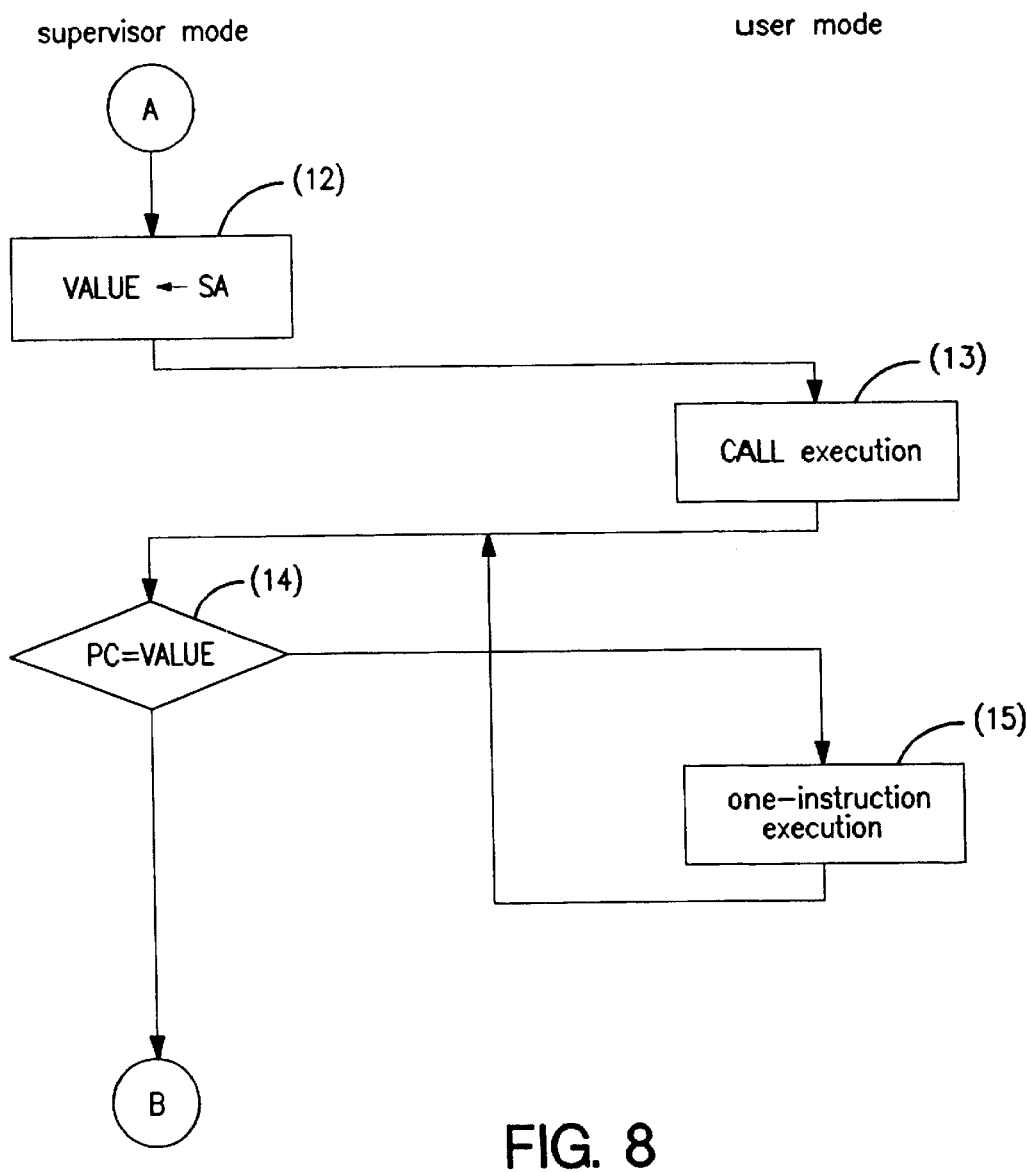
FIG. 8 is a flow chart showing a sub-program termination judgement in accordance with the fourth embodiment.
Figure 9:
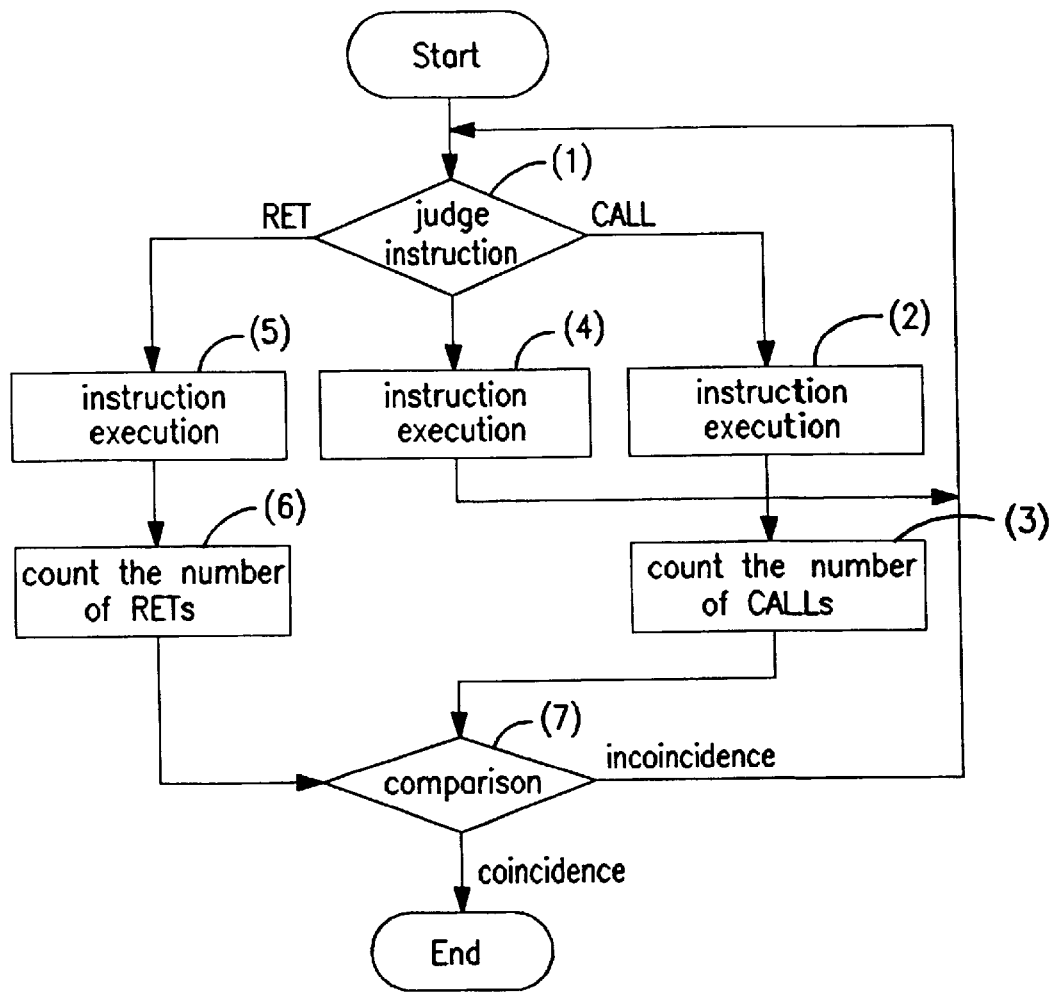
FIG. 9 is a flow chart showing a conventional sub-program termination judging method.
Figures 10, 11:
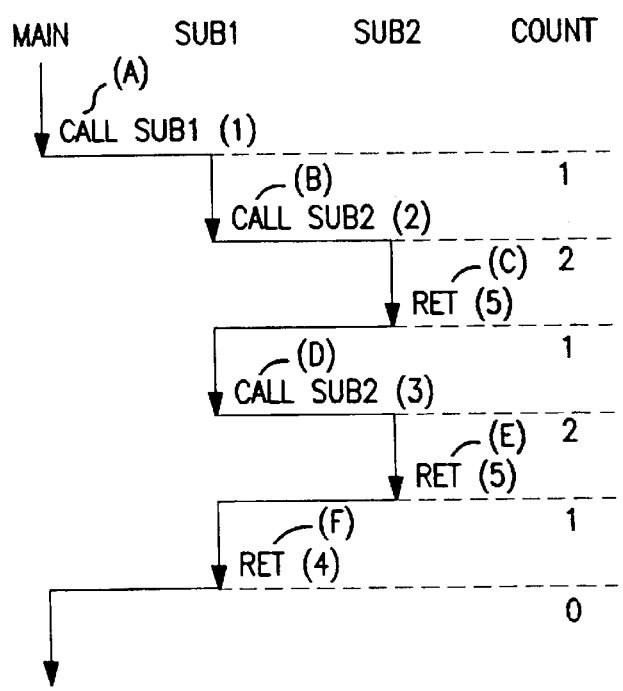
FIG. 10 is a diagram showing an example of program in the case of using no real time OS.
FIG. 11 is a schematic diagram showing a sub-program calling process through the program of FIG. 10.

FIGS. 6 to 8 are diagrams showing software which is realized in accordance with a third embodiment of the present invention. In this embodiment, the entire diagram of the program evaluation device in FIG. 2 does not include the program termination judging circuit 201 and the signals 213 and 215 accompanied by the circuit 201. Instead, software that determines the termination of the sub-program is stored in a ROM 207 as a part of the supervisor program.

Upon starting of the evaluation of a program, an evaluation processor 205 makes a step execution control signal 214 active through a CPU 202. Then, a flow chart shown in FIG. 6 is started. In other words, the step execution control signal 214 is made active regardless of the kind of an instruction, which is different from the conventional example and the second embodiment. It should be noted that although omitted in the flow chart of FIGS. 6 and 7, in the case of executing an instruction of a program to be debugged, the supervisor program issues a supervisor return instruction (RETSVI instruction). The RETSVI instruction allows the evaluation processor 205 to be shifted to the user mode and to return to the supervisor mode again after executing one instruction of the program to be debugged. The RETSVI instruction issues only when the step execution control signal 214 is active. Hereinafter, the flow charts shown in FIGS. 6 to 8 will be described.

In step (1), referring to ROM 209, an instruction code of an instruction to be executed by the program to be debugged is checked and then stored in a variable DATA which is stored in an RAM 206. In step (2), it is judged whether the instruction code is CALL or an instruction other than CALL. In this embodiment, it is assumed that a first byte of the instruction code that represents CALL is "01H", and a first byte of the instruction code that represent RET is "02H". Hence, the instruction code is judged by checking the first byte of the instruction code. In the case where the instruction is an instruction other than CALL in step (2), control branches to step (3) to execute one instruction and then is advanced to step (11). Also, in the case where the instruction is CALL in step (2), control branches to a flow chart that judges the termination of the sub-program shown in FIG. 7.

In the step (4) of FIG. 7, the address value of the stack pointer is stored in a variable VALUE which is held in the RAM 206. Then, the evaluation processor 205 shifts to the user mode to execute CALL of step (5), and returns to be in the supervisor mode again to proceed to step (6). In steps (6) and (7), it is judged whether the instruction called by CALL of step (5) is RET or an instruction other than RET. In step (7), in the case where it is an instruction other than RET, control branches to step (10) to execute one instruction, and then returns to step (6). Also, in the case where the instruction is RET in step (7), control branches to step (8) to execute RET, and then proceeds to step (9). In step (9), the variable VALUE which is held in step (4) is compared with the address value of the current stack pointer, and when they are incoincident with each other, control returns to step (6). Also, when they are coincident with each other, it is judged that the execution of the sub-program is terminated, and control proceeds to step (11) of FIG. 6. In step (11), the step execution control signal 214 is made inactive, and a process of monitoring the execution result of the program to be debugged is started.

As described above, according to the third embodiment of the present invention, the address value before the stack pointer changes during the process of executing the initial CALL is stored, and thereafter is compared successively with the address value of the stack pointer that changes so that it is compared with the address value after the stack pointer changes during process of executing RET that returns to the main program, thereby being capable of correctly determining the judgement of termination of the sub-program.

It should be noted that when returning from the sub-program to the main program, there is the possibility of using BR which is a branch instruction without using RET. FIG. 8 shows a fourth embodiment that copes with this case. FIG. 8 is a flow chart for judging the termination of the sub-program, and the flow chart is positioned between A and B in FIG. 6. Hence, the process is the same as that of the third embodiment until CALL is detected. In this embodiment, in step (12), a return address (SA) per se stored in a stack region is stored in the variable VALUE when executing CALL in the program to be debugged. In step (14), a program counter PC is compared with the variable VALUE, and if they are incoincident with each other, a next instruction is executed in step (15), but if they are coincident with each other, control branches to step (11) of FIG. 6. In other words, in this embodiment, even though control returns to the main program without using RET, the procedure step is normally executed.

As described above, according to the present invention, in the procedure step execution for a program using a real time OS or a program that calls re-start, although in the conventional method of counting the number of execution of the sub-program call instructions and the return instructions, there is a case in which the termination of execution of the sub-program cannot be correctly judged, using the stack pointer that changes in accordance with the execution of the call instruction and the return instruction of the sub-program, a change in the address value is checked, thereby being capable of correctly judging the termination of execution of the sub-program. The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A program evaluation device for evaluating a program stored in a memory circuit, said program having a main routine, first and second sub-routines, said main routine including a plurality of instructions containing a first call instruction whose execution causes a call of said first sub-routine, said first sub-routine including a plurality of instructions containing a second call instruction whose execution causes a call of said second sub-routine and a first return instruction whose execution causes a return to said main routine, and said second sub-routine including a plurality of instructions containing a second return instruction whose execution causes a return to said first sub-routine, said program evaluation device comprising:

an evaluation processor executing said program and having a stack memory and a stack pointer, said stack memory having a plurality of storage regions, a first one of said storage regions being used to store a first return address for returning the execution of said program from said first sub-routine to said main routine, a second one of said storage regions being used to store a second return address for returning the execution of said program from said second sub-routine to said first sub-routine, said stack pointer producing stack address information that points one of said storage regions of said stack memory, said stack address information being changed in one direction each time when at least one of said first and second call instructions is executed and in an opposite direction each time when at least one of said first and second return instructions is executed;

a latch circuit coupled to said evaluation processor to latch, in response to execution of said first call instruction, the stack address information from said stack pointer; and a comparison circuit having a first input side coupled to said evaluation processor to receive the stack address information from said stack pointer which is changeable and a second input side coupled to said latch circuit to receive the stack address information from said latch circuit which is latched therein, said comparison circuit outputting a coincident signal when the information at said first input side is coincident with the information at said second input side and supplying said coincident signal to said evaluation processor to inform said evaluation processor of completion of the execution of said first sub-routine.

2. The device as claimed in claim 1, wherein by the execution of said first and second call instructions, a corresponding one of said first and second return addresses is stored in one of said storage regions pointed by the stack address information, the stack address information is then changed, and a call strobe signal is thereafter produced, a corresponding one of said first and second return addresses is read out from said stack memory while a return strobe signal is being produced by the execution of one of said first and second return instructions, and a stack address information is then changed with stopping production of said return strobe signal;

said latch circuit is constructed to latch the stack address information from said stack pointer in response to said call strobe signal that is produced by the execution of said first call instruction; and said comparison circuit is constructed to be activated when said return strobe signal is being produced.

3. A method of evaluating a program by an evaluation processor executing instructions for said program, said program having a main routine, first and second sub-routines, said main routine including a plurality of instructions containing a first call instruction whose execution causes a call of said first sub-routine, said first sub-routine including a plurality of instructions containing a second call instruction whose execution causes a call of said second sub-routine and a first return instruction whose execution causes a return to said main routine, and said second sub-routine including a plurality of instructions containing a second return instruction whose execution causes a return to said first sub-routine, said evaluation processor having a stack memory and a stack pointer, said stack memory having a plurality of storage regions, a first one of said storage regions being used to store a first return address for returning the execution of said program from said first sub-routine to said main routine, a second one of said storage regions being used to store a second return address for returning the execution of said program from said second sub-routine to said first sub-routine, said stack pointer producing stack address information that points to one of said storage regions of said stack memory, said stack address information being changed in one direction each time when at least one of said first and second call instructions is executed and in an opposite direction each time when at least one of said first and second return instructions is executed, said method comprising the steps of:

latching the stack address information from said stack pointer in response to execution of said first call instruction to provide a latched address information;

comparing the stack address information from said stack pointer which is changeable during the execution of said first and second sub-routines with said latched address information; and indicating a completion of the execution of said first sub-routine when said stack address information from said stack pointer which is changeable coincides with said latched address information.

4. The method as claimed in claim 3, wherein said latched address information represents the stack address information before execution of said first call instruction, said comparing step compares the stack address information from said stack pointer after execution of each of said first and second return instructions with said latched address information.

5. The method as claimed in claim 3, wherein said latched address information represents the stack address information after execution of said first call instruction, said comparing step compares the stack address information from said stack pointer before execution of each of said first and second return instructions with said latched address information.

* * * * *